(12) United States Patent
Olson et al.

(10) Patent No.: US 11,613,076 B2
(45) Date of Patent: Mar. 28, 2023

(54) THREE-DIMENSIONAL PRINTING PROCESSES USING 1,1-DI-ACTIVATED VINYL COMPOUNDS

(71) Applicant: PPG Industries Ohio, Inc., Cleveland, OH (US)

(72) Inventors: Kurt G. Olson, Gibsonia, PA (US); Aditya Gottumukkala, Monroeville, PA (US); Cynthia Kutchko, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1099 days.

(21) Appl. No.: 16/320,588

(22) PCT Filed: Jul. 26, 2017

(86) PCT No.: PCT/US2017/044001
§ 371 (c)(1),
(2) Date: Jan. 25, 2019

(87) PCT Pub. No.: WO2018/022785
PCT Pub. Date: Feb. 1, 2018

(65) Prior Publication Data
US 2019/0160739 A1 May 30, 2019

Related U.S. Application Data

(60) Provisional application No. 62/416,758, filed on Nov. 3, 2016, provisional application No. 62/366,781, filed on Jul. 26, 2016.

(51) Int. Cl.
*B29C 64/00* (2017.01)
*B29C 64/165* (2017.01)
(Continued)

(52) U.S. Cl.
CPC ............ *B29C 64/165* (2017.08); *B29C 64/00* (2017.08); *B29C 64/10* (2017.08); *B29C 64/176* (2017.08);
(Continued)

(58) Field of Classification Search
CPC ............................... B29C 64/165; C08L 35/02
See application file for complete search history.

(56) References Cited

U.S. PATENT DOCUMENTS

| 3,197,318 A | 7/1965 | Halpern et al. |
| 3,660,263 A | 5/1972 | Auletta et al. |

(Continued)

FOREIGN PATENT DOCUMENTS

| CN | 105879 A | 10/2001 |
| CN | 101568422 A | 10/2009 |

(Continued)

OTHER PUBLICATIONS

International Search Report and Written Opinion for International Patent Application No. PCT/US2017/044010, dated Oct. 30, 2017.
(Continued)

*Primary Examiner* — Nicholas R Krasnow
(74) *Attorney, Agent, or Firm* — K&L Gates LLP

(57) ABSTRACT

A process for producing an article by three-dimensional printing includes applying a 1,1-di-activated vinyl compound-containing liquid binder over a predetermined area of a layer of solid particles. The liquid binder infiltrates gaps between the solid particles to form a first cross-sectional layer of an article, and the 1,1-di-activated vinyl compound reacts to solidify the liquid binder and bind the solid particles in the first cross-sectional layer of the article. Also provided is an article produced by the three-dimensional printing process, set forth herein.

20 Claims, 9 Drawing Sheets

(51) Int. Cl.
  *B33Y 70/10* (2020.01)
  *B33Y 70/00* (2020.01)
  *B29C 64/20* (2017.01)
  *B33Y 99/00* (2015.01)
  *B29C 64/176* (2017.01)
  *B29C 64/245* (2017.01)
  *B29C 64/25* (2017.01)
  *B33Y 40/00* (2020.01)
  *B33Y 40/10* (2020.01)
  *B29C 64/182* (2017.01)
  *B29C 64/205* (2017.01)
  *B33Y 50/00* (2015.01)
  *B33Y 30/00* (2015.01)
  *B33Y 40/20* (2020.01)
  *B29C 64/227* (2017.01)
  *B29C 64/10* (2017.01)
  *B29C 64/30* (2017.01)
  *B29C 64/307* (2017.01)
  *B29C 64/255* (2017.01)
  *B29C 64/40* (2017.01)
  *C08L 35/02* (2006.01)
  *B33Y 80/00* (2015.01)
  *B33Y 10/00* (2015.01)
  *B29K 35/00* (2006.01)
  *B29K 305/10* (2006.01)
  *B29K 305/12* (2006.01)
  *B29K 309/08* (2006.01)

(52) U.S. Cl.
  CPC ............ *B29C 64/182* (2017.08); *B29C 64/20* (2017.08); *B29C 64/205* (2017.08); *B29C 64/227* (2017.08); *B29C 64/245* (2017.08); *B29C 64/25* (2017.08); *B29C 64/255* (2017.08); *B29C 64/30* (2017.08); *B29C 64/307* (2017.08); *B29C 64/40* (2017.08); *B33Y 30/00* (2014.12); *B33Y 40/00* (2014.12); *B33Y 40/10* (2020.01); *B33Y 40/20* (2020.01); *B33Y 50/00* (2014.12); *B33Y 70/00* (2014.12); *B33Y 70/10* (2020.01); *B33Y 99/00* (2014.12); *C08L 35/02* (2013.01); *B29K 2035/00* (2013.01); *B29K 2305/10* (2013.01); *B29K 2305/12* (2013.01); *B29K 2309/08* (2013.01); *B33Y 10/00* (2014.12); *B33Y 80/00* (2014.12); *G03G 2215/2054* (2013.01); *G05B 2219/49023* (2013.01); *G05B 2219/49246* (2013.01); *Y10T 156/1722* (2015.01); *Y10T 156/1798* (2015.01)

(56) References Cited

U.S. PATENT DOCUMENTS

| | | | |
|---|---|---|---|
| 4,382,109 | A | 5/1983 | Olson et al. |
| 4,452,861 | A | 6/1984 | Okamoto et al. |
| 4,740,534 | A | 4/1988 | Matsuda et al. |
| 4,885,191 | A | 12/1989 | Podszun et al. |
| 5,321,112 | A | 6/1994 | Olson |
| 5,639,828 | A | 6/1997 | Briggs et al. |
| 5,723,275 | A | 3/1998 | Wang et al. |
| 6,517,940 | B1 | 2/2003 | Millero et al. |
| 8,609,885 | B2 | 11/2013 | Malofsky et al. |
| 8,884,051 | B2 | 11/2014 | Malofsky et al. |
| 9,108,914 | B1 | 8/2015 | Malofsky et al. |
| 9,181,365 | B2 | 11/2015 | Malofsky et al. |
| 9,221,739 | B2 | 12/2015 | Malofsky et al. |
| 9,334,430 | B1 | 5/2016 | Stevenson et al. |
| 9,416,091 | B1 | 8/2016 | Sullivan et al. |
| 9,567,475 | B1 | 2/2017 | Palsule et al. |
| 2003/0030170 | A1 | 2/2003 | Abe et al. |
| 2003/0042142 | A1 | 3/2003 | Yamoto et al. |
| 2005/0171273 | A1 | 8/2005 | Ledwidge et al. |
| 2014/0275419 | A1 | 9/2014 | Ward et al. |
| 2014/0288230 | A1 | 9/2014 | Malofsky et al. |
| 2014/0329980 | A1 | 11/2014 | Malofsky et al. |
| 2015/0056879 | A1 | 2/2015 | Malofsky et al. |
| 2015/0104660 | A1 | 4/2015 | Malofsky et al. |
| 2015/0361283 | A1* | 12/2015 | Malofsky ................. C09D 4/00 524/854 |
| 2016/0068618 | A1 | 3/2016 | Sullivan et al. |
| 2017/0326789 | A1* | 11/2017 | Kimblad ............... B29C 64/153 |
| 2018/0094115 | A1 | 4/2018 | Martz et al. |
| 2019/0153244 | A1 | 5/2019 | Puodziukynaite et al. |
| 2019/0161620 | A1 | 5/2019 | Zalich et al. |
| 2019/0161637 | A1 | 5/2019 | Olson et al. |
| 2019/0161640 | A1 | 5/2019 | Gottumukkala et al. |

FOREIGN PATENT DOCUMENTS

| | | |
|---|---|---|
| CN | 101616785 A | 12/2009 |
| CN | 102796909 A | 11/2012 |
| CN | 103520771 A | 1/2014 |
| CN | 104312246 A | 1/2015 |
| CN | 104821248 A | 8/2015 |
| CN | 105377450 A | 3/2016 |
| CN | 105536049 A | 5/2016 |
| CN | 105585879 A | 5/2016 |
| EP | 0046088 A1 | 2/1982 |
| EP | 0327129 A1 | 8/1989 |
| EP | 0829756 A2 | 3/1998 |
| EP | 3042939 A1 | 7/2016 |
| JP | 2008019350 A | 1/2008 |
| JP | 2013100599 A | 5/2013 |
| JP | 2014077024 A | 5/2014 |
| KR | 20140145084 A | 12/2014 |
| WO | 0032709 A1 | 6/2000 |
| WO | 2008086033 A1 | 7/2008 |
| WO | 2013036347 A1 | 3/2013 |
| WO | 2013059473 A2 | 4/2013 |
| WO | 2013149173 A1 | 10/2013 |
| WO | 2015165808 A1 | 11/2015 |
| WO | 2015200201 A1 | 12/2015 |
| WO | 2017210415 A1 | 12/2017 |
| WO | 2018022804 A1 | 2/2018 |
| WO | 2018022810 A1 | 2/2018 |

OTHER PUBLICATIONS

International Search Report and Written Opinion for International Patent Application No. PCT/US2017/043995, dated Nov. 7, 2017.
International Search Report and Written Opinion for International Patent Application No. PCT/US2017/044041, dated Nov. 7, 2017.
International Search Report and Written Opinion for International Patent Application No. PCT/US2017/044001, dated Oct. 30, 2017.
International Search Report and Written Opinion for International Patent Application No. PCT/US2017/044032, dated Nov. 6, 2017.
International Search Report and Written Opinion for International Patent Application No. PCT/US2017/044014, dated Oct. 27, 2017.
International Search Report and Written Opinion for International Patent Application No. PCT/US2017/044005, dated Nov. 3, 2017.
Mitsubishi International Polymertrade Corporation; Triallyl Isocyanurate TAIC Product Description; http://www.micchem.com/trially_isocyanurate.html; Jun. 4, 2019; 6 pages; U.S.
Zhai, Haichao, et al., Practical Formula and Production Technique of Binders, p. 21. (relevance described at paragraph 5 of accompanying pp. 3-4 of Notification of the First Office Action for Chinese Application for Invention No. 201780046174.3. dated May 20, 2020.).

* cited by examiner

THREE-DIMENSIONAL PRINTING PROCESSES USING 1,1-DI-ACTIVATED VINYL COMPOUNDS

BACKGROUND OF THE INVENTION

Three-dimensional printing, also known as additive manufacturing or rapid prototyping, involves the production of three-dimensional articles by synthesizing successive layers of solid material that collectively bond together to form the articles. Various types of three-dimensional printing processes and equipment for building an article layer-by-layer have been developed. Examples of three-dimensional printing processes include stereolithography/photopolymerization, selective laser sintering, electron beam melting, extrusion deposition, and particle binding with liquid binders delivered using inkjet-like printer nozzles (the "liquid binder method"). Three-dimensional printing processes and equipment are typically computer-controlled, which facilitates the direct production of articles from computer-aided design (CAD) models.

SUMMARY OF THE INVENTION

The invention described in this specification generally relates to materials and methods for the three-dimensional printing of articles.

A process for producing an article by three-dimensional printing comprises positioning a layer of solid particles in a planar bed. A liquid binder is applied over a predetermined area of the layer of solid particles. The liquid binder comprises a 1,1-di-activated vinyl compound, or a multifunctional form thereof, or a combination thereof. The gaps between the solid particles are infiltrated with the liquid binder in the predetermined area of the layer of solid particles to form a first cross-sectional layer of an article. The 1,1-di-activated vinyl compound, or multifunctional form thereof, or combination thereof, is reacted to solidify the liquid binder and bind the solid particles in the first cross-sectional layer of the article.

A three-dimensional article comprises a plurality of cross-sectional layers bonded together. Each cross-sectional layer comprises a solid binder comprising a reaction product of a 1,1-di-activated vinyl compound, or a multifunctional form thereof, or a combination thereof. A plurality of solid particles are embedded in the solid binder.

It is understood that the invention described in this specification is not necessarily limited to the examples summarized in this Summary.

BRIEF DESCRIPTION OF THE DRAWINGS

Various features and characteristics of the invention described in this specification may be better understood by reference to the accompanying figures, in which.

Figure 1A:
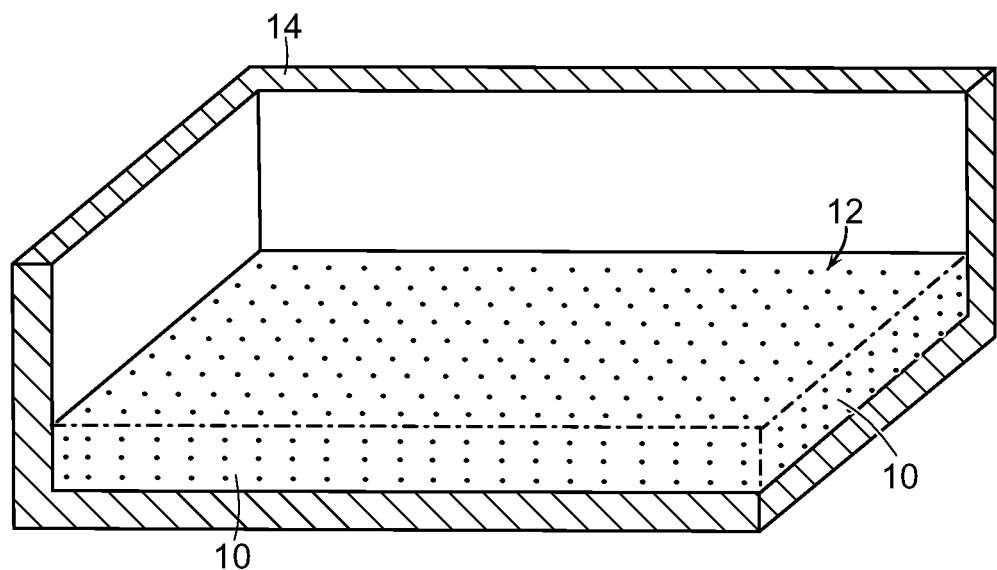
FIG. 1A is a cross-sectional schematic diagram in perspective view showing a layer of solid particles in a stationary planar bed.

The reader will appreciate the foregoing features and characteristics, as well as others, upon considering the following detailed description of the invention according to this specification.

DETAILED DESCRIPTION OF THE INVENTION

As used in this specification, particularly in connection with coatings, layers, or films, the terms "on," "onto," "over," and variants thereof (e.g., "applied over," "formed over," "deposited over," "provided over," "located over," and the like), mean applied, formed, deposited, provided, or otherwise located over a surface of a substrate or a powder bed, but not necessarily in contact with the surface of the substrate or powder bed, unless explicitly stated so. For example, a coating layer "applied over" a substrate does not preclude the presence of one or more other coating layers of the same or different composition located between the applied coating layer and the substrate. Likewise, a second coating layer "applied over" a first coating layer does not preclude the presence of one or more other coating layers of the same or different composition located between the applied second coating layer and the applied first coating layer.

As used in this specification, the terms "polymer" and "polymeric" means prepolymers, oligomers, and both homopolymers and copolymers. As used in this specification, "prepolymer" means a polymer precursor capable of further reactions or polymerization by one or more reactive groups to form a higher molecular mass or cross-linked state.

As used in this specification, the term "1,1-di-activated vinyl compound" means a compound comprising a vinyl group having two electron withdrawing groups (EWG) covalently bonded to one of the π-bonded carbons and no substituents covalently bonded to the other π-bonded carbon (i.e., -EWG-C(=CH$_2$)-EWG-), wherein the electron withdrawing groups independently comprise halogen groups, haloalkyl groups, carbonyl-containing groups (e.g., esters, amides, aldehydes, ketones, acyl halides, carboxylic/carboxylate groups), cyano groups, sulfonate groups, ammonium groups, quaternary amine groups, or nitro groups. The term "multifunctional form" means a compound comprising two or more 1,1-di-activated vinyl groups covalently bonded in one molecule. For instance, a dialkyl methylene malonate is an example of a 1,1-di-activated vinyl compound, and a transesterification adduct of a dialkyl methylene malonate and a polyol is an example of a multifunctional form of a dialkyl methylene malonate.

The present invention is directed to materials and methods for the three-dimensional printing of articles. In the liquid binder method of three-dimensional printing, an inkjet-like printing nozzle delivers a liquid binder (or a solution of binder or a dispersion of binder particles in a liquid solvent or other volatile carrier) onto layers of solid particles (powders) in a cross-sectional pattern. The liquid binder infiltrates into the gaps between the particles of the powder material, wets out the particles, and hardens (e.g., solidifies by polymerization, chemical crosslinking, or solidification of molten binder), thereby bonding the powder material into a solidified layer in the shape of the cross-sectional pattern. After the first cross-sectional portion is formed, the previous steps are repeated, building successive cross-sectional portions until the final article is formed comprising the solid particles embedded in the solidified binder. The solidified binder also bonds each cross-sectional layer to the previous layer, thereby building up a monolithic and integral three-dimensional article in a layer-by-layer fashion.

FIGS. 1A-1D show a process for producing an article by three-dimensional printing. Referring to FIG. 1A, a layer of solid particles 10 is positioned in a planar bed 12 in a container 14. As used in this specification, the term "layer of solid particles" means a collection of solid particles forming a bed. A layer of solid particles can have any thickness, provided that a liquid binder can infiltrate into the gaps between the collection of solid particles and through the thickness of the layer of solid particles. The layer of solid particles 10 comprises powder or other collection of particulate materials, which can be present in a loose and free-flowable form (i.e., un-compacted) or in a compacted density. The layer of solid particles 10 can be positioned in the planar bed 12 in the container 14 using any suitable application techniques and equipment (not shown), such as, for example, pneumatically-operated or gravity-driven powder dispensers, which dispense a uniform layer of powder as they travels across the planar bed 12 (see, e.g., U.S. Pat. Nos. 7,828,022 B2; 6,672,343 B1; and U.S. Patent Publication No. 2010/0272519 A1, which are incorporated by reference into this specification).

Additional powder spreading techniques and equipment include, for example, a spreading blade, which is at least as long as the width of the planar bed 12, and wipes across the surface of the planar bed 12 to spread out powder deposited by a powder dispenser (see, e.g., U.S. Pat. Nos. 5,387,380 and 6,799,959 B1, which are incorporated by reference into this specification), and a counter-rotating roller, which is at least as long as the width of the planar bed 12, and traverses across the surface of the planar bed to spread out powder that is deposited by a powder dispenser (see, e.g., U.S. Pat. No. 5,597,589; U.S. Patent Publication No. 2001/0050448 A1; and U.S. Pat. No. 8,568,124 B2, which are incorporated by reference into this specification). The layer of solid particles 10 can be positioned in the planar bed 12 in the container 14 by spreading a powder comprising the solid particles using a counter-rotating roller that rotates in a direction opposite to that which the roller would rotate if it were simply being rolled across the surface of the planar bed 12. Such "counter-rotating" roller powder spreaders have been found to give superior results to blade powder spreaders because the rotating action of the roller picks up and redistributes the dispensed powder in front of the roller as it is encountered instead of just pushing the powder pile, thus better overcoming the distribution disparities of the as-deposited powder. The rotation action at the trailing side of the roller provides a consistent gentle compaction of the powder material and is less likely to disrupt the location or damage underlying cross-sectional layers that previously received binder.

The layer of solid particles 10 can be positioned in the planar bed 12 with a suitable thickness to form an individual constituent layer used to build-up three-dimensional articles in a layer-by-layer fashion. The layer of solid particles 10 can have a thickness ranging from 10 μm to 1000 μm, or any sub-range subsumed therein, such as, for example, 25-500 μm, 50-250 μm, 80-180 μm, or 100-150 μm. In practice, the thickness of the layer of solid particles is limited, in part, by the amount of liquid binder that can be delivered to the layer, as described below.

Figure 1B:
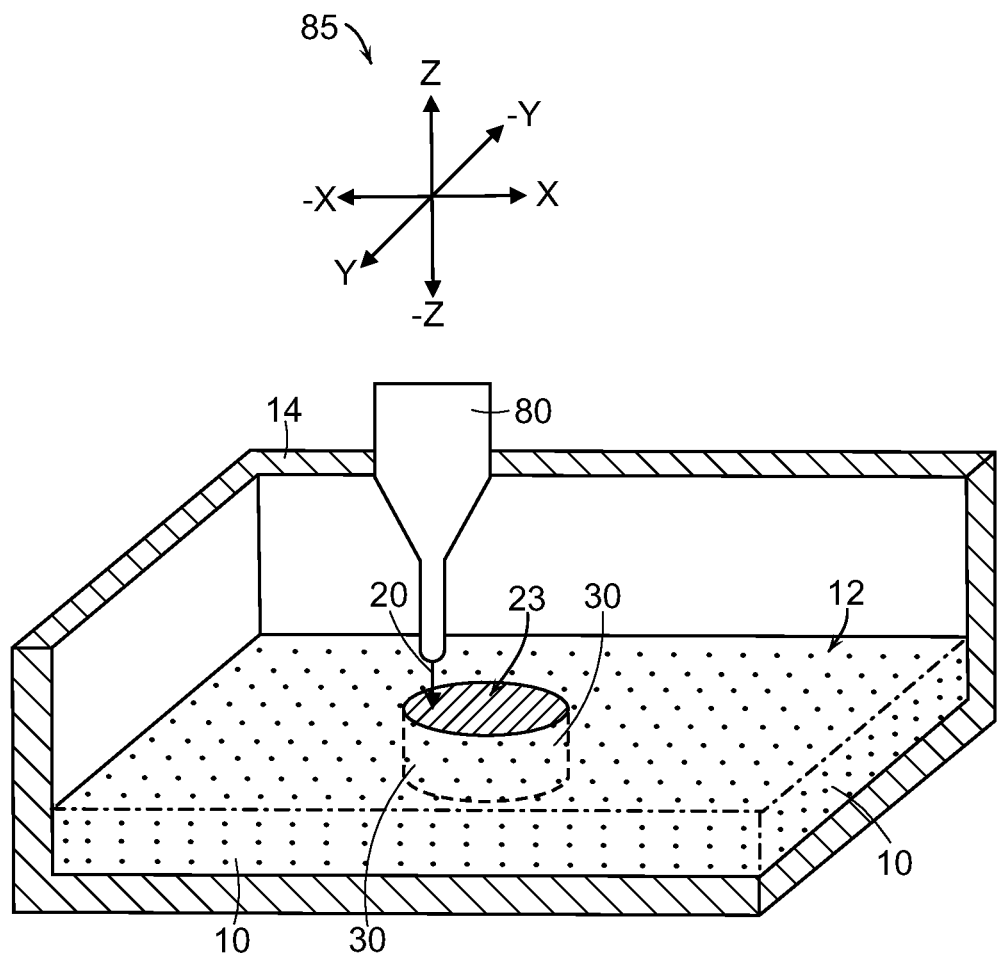
FIG. 1B is a cross-sectional schematic diagram in perspective view showing the application of a liquid binder over a predetermined area of the layer of solid particles shown in FIG. 1A, and the infiltration of the gaps between the solid particles with the liquid binder in the predetermined area to form a first cross-sectional layer of an article.

Referring to FIG. 1B, a liquid binder 20 is applied over a predetermined area 23 of the layer of solid particles 10 in the planar bed 12 in the container 14. The liquid binder 20 comprises a 1,1-di-activated vinyl compound, or a multifunctional form thereof, or a combination thereof, as described below. The liquid binder 20 infiltrates the gaps between the solid particles in the predetermined area 23 of the layer of solid particles 10, wets out the solid particles, and forms a first cross-sectional layer 30 of an article. The 1,1-di-activated vinyl compound, or multifunctional form thereof, or combination thereof, in the liquid binder 20 reacts, as described below, and solidifies the liquid binder 20, which binds together the solid particles in the first cross-sectional layer 30.

The liquid binder 20 is applied over the predetermined area 23 of the layer of solid particles 10 using a suitable nozzle 80. The nozzle 80 can be computer-controlled and have six translational degrees-of-freedom, as indicated at 85—i.e., the nozzle 80 can move in the X and Y directions parallel to the planar bed 12 to apply the liquid binder 20 in the predetermined area 23, and the nozzle 80 can move in the Z direction perpendicular to the planar bed 12 to position the nozzle 80 closer to or farther away from the planar surface of the layer of solid particles 10. The ability to move in the Z direction perpendicular to the planar bed 12 also allows the nozzle to accommodate the positioning of additional layers of solid particles over the first layer 10, as described below, while maintaining a controlled distance relative to the planar surface of the layer of solid particles 10.

Figure 1C:
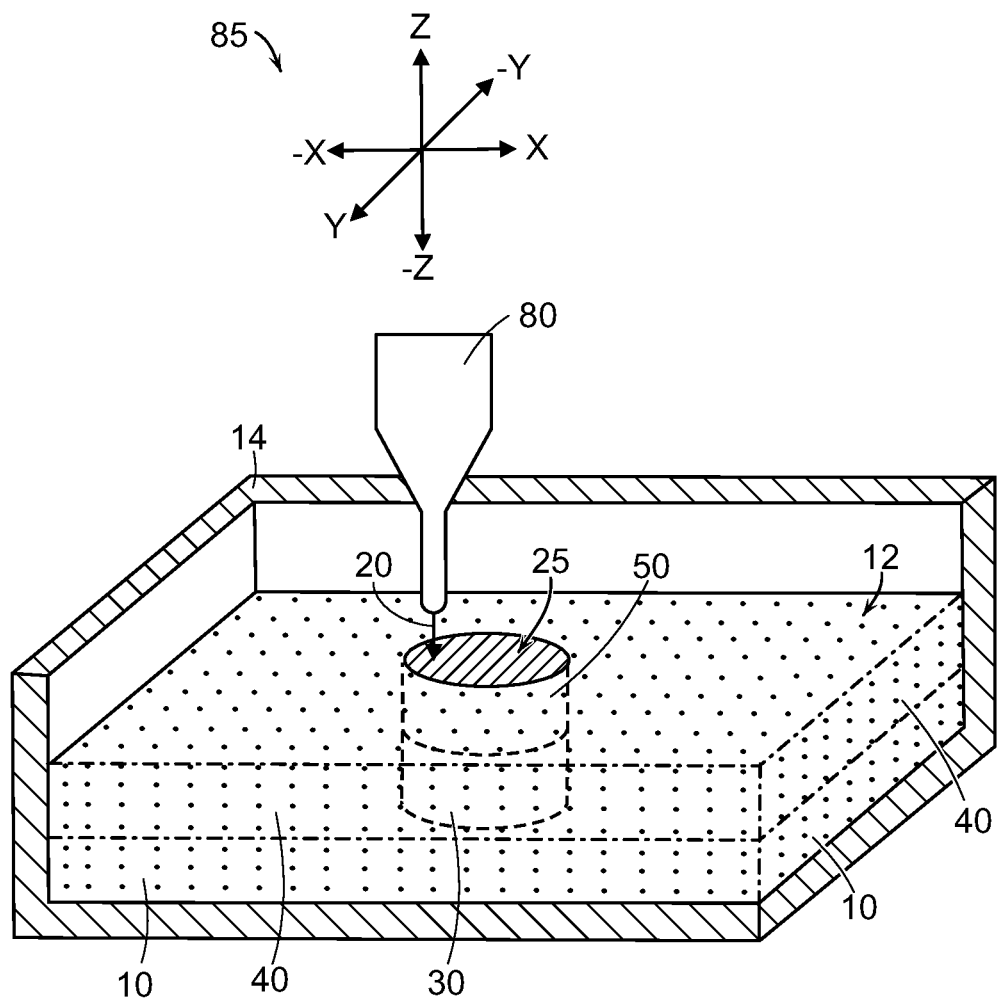
FIG. 1C is a cross-sectional schematic diagram in perspective view showing (i) the positioning of a second layer of solid particles over the first cross-sectional layer of the article shown in FIG. 1B, (ii) the application of additional liquid binder over a predetermined area of the second layer of solid particles, and (iii) the infiltration of the gaps between the solid particles with the additional liquid binder in the predetermined area of the second layer of solid particles to form a second cross-sectional layer of an article, wherein the second cross-sectional layer of the article is located over and in physical contact with the first cross-sectional layer of the article.
Figure 1D:
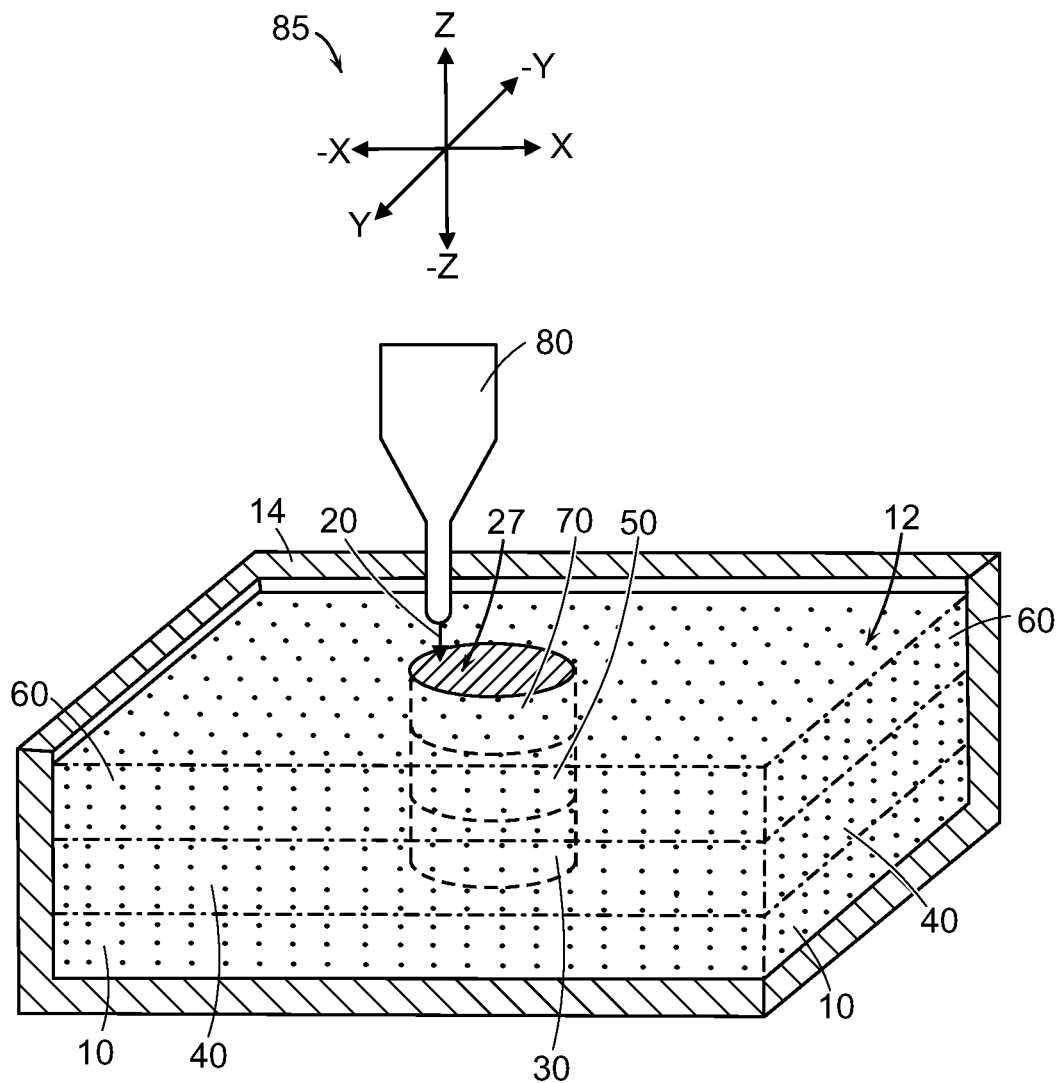
FIG. 1D is a cross-sectional schematic diagram in perspective view showing (i) the positioning of a third layer of solid particles over the second cross-sectional layer of the article shown in FIG. 1C, (ii) the application of additional liquid binder over a predetermined area of the third layer of solid particles, and (iii) the infiltration of the gaps between the solid particles with the additional liquid binder in the predetermined area of the third layer of solid particles to form a third cross-sectional layer of an article, wherein the third cross-sectional layer of the article is located over and in physical contact with the second cross-sectional layer of the article.

Although not shown in FIGS. 1B-1C, it is understood that implementations of the processes described in this specification can utilize two or more nozzles to apply the liquid binder 20 in the predetermined area 23 (for example, an inkjet-like print head comprising multiple nozzles). It may be desirable to produce three-dimensional printed articles comprising relative small structural features. The size of the structural features that can be produced is determined, in part, by the size of the droplets dispensed from the nozzle 80 (or multiple nozzles, if employed). In general, smaller nozzles produce smaller droplets and smaller structural features. However, smaller nozzles reduce the printing speed because the volume of liquid binder applied onto the layer of solid particles 10. The size of the nozzle 80 (or multiple nozzles, if employed) and the resulting droplets of liquid binder applied onto the layer of solid particles 10 may be practically limited by the dimensional tolerances and the acceptable amount of distortion in the final three-dimensional article.

A process for producing an article by three-dimensional printing can further comprise repeating the powder/particle-positioning, liquid binder application, infiltration, and reaction steps, as described herein, a plurality of times to produce a plurality of bonded cross-sectional layers that together comprise the three-dimensional article. Referring to FIG. 1C, the nozzle 80 is moved upwardly (along the Z-axis) away from the surface of the first layer of solid particles 10 and the first cross-sectional layer 30 of the three-dimensional article being printed. A second layer of solid particles 40 is positioned over the first layer of solid particles 10 and over the first cross-sectional layer 30 of the article. Additional liquid binder 20 is applied over a predetermined area 25 of the second layer of solid particles 40 in the planar bed 12 in the container 14. The liquid binder 20 comprises a 1,1-di-activated vinyl compound, or a multifunctional form thereof, or a combination thereof, as described below. The liquid binder 20 infiltrates the gaps between the solid particles in the predetermined area 25 of the second layer of solid particles 40, wets out the solid particles, and forms a second cross-sectional layer 50 of the article. The second cross-sectional layer 50 is located over and in physical contact with the first cross-sectional layer 30 of the article. The 1,1-di-activated vinyl compound, or multifunctional form thereof, or combination thereof, in the liquid binder 20 reacts, as described below, and solidifies the liquid binder 20, which binds together the solid particles in the second cross-sectional layer 50, and also binds together the first cross-sectional layer 30 and the second cross-sectional layer 50.

Referring to FIG. 1D, the nozzle 80 is again moved upwardly (along the Z-axis) away from the surface of the second layer of solid particles 40 and the second cross-sectional layer 50 of the three-dimensional article being printed. A third layer of solid particles 60 is positioned over the second layer of solid particles 40 and over the second cross-sectional layer 50 of the article. Additional liquid binder 20 is applied over a predetermined area 27 of the third layer of solid particles 60 in the planar bed 12 in the container 14. The liquid binder 20 comprises a 1,1-di-activated vinyl compound, or a multifunctional form thereof, or a combination thereof, as described below. The liquid binder 20 infiltrates the gaps between the solid particles in the predetermined area 27 of the third layer of solid particles 60, wets out the solid particles, and forms a third cross-sectional layer 70 of the article. The third cross-sectional layer 70 is located over and in physical contact with the second cross-sectional layer 50 of the article. The 1,1-di-activated vinyl compound, or multifunctional form thereof, or combination thereof, in the liquid binder 20 reacts, as described below, and solidifies the liquid binder 20, which binds together the solid particles in the third cross-sectional layer 70, and also binds together the second cross-sectional layer 50 and the third cross-sectional layer 70.

As described, the powder/particle-positioning, liquid binder application, infiltration, and reaction steps can be repeated a plurality of times to produce a plurality of bonded cross-sectional layers that together comprise the three-dimensional article. The liquid binder can be applied in any predetermined two-dimensional pattern (circular, in the figures, for purposes of illustration only) to produce the constituent cross-sectional layers using any suitable mechanism, such as a Drop-On-Demand printhead driven by customized software which receives data from a CAD system. The hardening/curing reaction of the 1,1-di-activated vinyl compound produces solidified and relatively rigid cross-sectional portions of the final three-dimensional article. Maximizing the amount of liquid binder applied onto and infiltrated into the cross-sectional layers can ensure that sufficient binder is available to bond together the solid particles within each layer and also to bond together each adjacent layer into a monolithic and integral three-dimensional article.

For optimal adherence and/or bonding between the constituent cross-sectional layers, any given cross-sectional layer should maintain an at least partially unhardened or unsolidified state at the time the subsequent cross-sectional layer is applied onto that layer. This results in relatively simultaneous solidification and integration of adjacent cross-sectional layers where the respective layers contact each other. A less optimal bond may form between constituent layers where solidification of a preceding layer is complete before application of a subsequent layer.

The predetermined two-dimensional pattern or cross-sectional shape of a layer can be the same or different from that of an adjacent layer, or any other layer. It is understood, however, that in order to form a monolithic and integral three-dimensional article, at least a portion of each constituent cross-sectional layer must physically contact and bond to at least a portion of an adjacent constituent cross-sectional layer or layers. The two-dimensional pattern (i.e., the predetermined area) for each constituent cross-sectional layer can be inputted from a computer that controls the motion and binder output rate of the printing nozzle or nozzles. In such examples, the accumulation of the perimeter contours of each constituent cross-sectional layer represents the outer surface of the three-dimensional article as modeled in computer memory using CAD software.

Referring again to FIGS. 1A-1D, any unhardened or unsolidified particulate material in the planar bed 12 that was not exposed to the liquid binder 20 remains loose and free-flowing. The unhardened or unsolidified particulate material is left in place in the planar bed 12 until formation of the final three-dimensional article is complete. Leaving the unhardened or unsolidified particulate material in place ensures that the article is mechanically supported during production, allowing features such as overhangs, undercuts, and cavities (not shown) to be defined without using separate support structures.

Figure 2A:
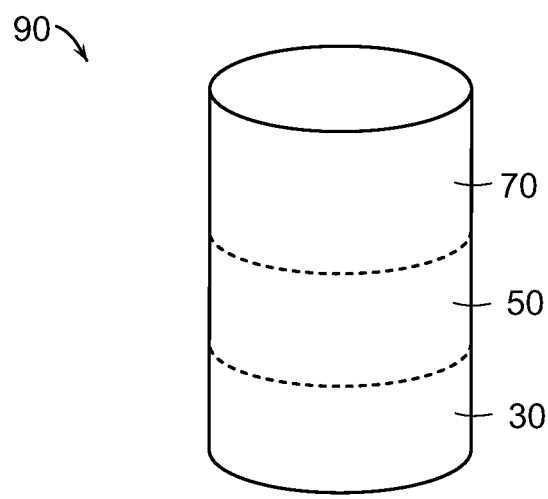
FIGS. 2A and 2B are schematic diagrams in perspective view of the three-dimensional printed article produced in accordance with the examples shown in FIGS. 1A-1D and 3A-3D.
Figure 2B:
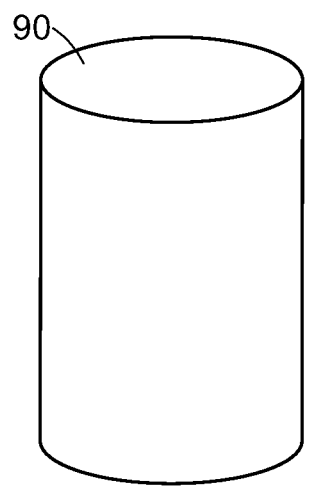

Referring again to FIG. 1D, at the end of a three-dimensional printing process, after the final article is completely formed, only the top surface of the final article is visible in the container 14. The final article is otherwise immersed in the planar bed 12 of loose (unhardened or unsolidified) particulate material that did not contact the liquid binder 20. FIGS. 2A and 2B are schematic diagrams of the final three-dimensional article 90 produced by the process illustrated in FIGS. 1A-1D. The article 90 is a monolithic and integral three-dimensional article comprising a plurality of cross-sectional layers (30, 50, and 70) bonded together. Each cross-sectional layer comprises solid binder comprising a reaction product of a 1,1-di-activated vinyl compound, or a multifunctional form thereof, or a combination thereof, and a plurality of solid particles embedded in the solid binder.

After removal of the three-dimensional article 90 from the planar bed 12, loose particulate material can be removed, for example, by air blowing, and the article 90 can undergo post-processing treatments such as, for example, cleaning, infiltration with stabilizing materials, and coating. For example, the three-dimensional article 90 in the as-printed state, although monolithic and integral, can nevertheless be relatively porous. The article 90 can therefore be infiltrated and/or coated with a variety of materials to improve the article's hardness, strength, toughness, surface properties, or any combination thereof. Infiltrating materials and/or coatings can fill in any pores in the article 90, thereby improving the article's surface finish, and making the article 90 more water-resistant and/or organic solvent-resistant. Suitable infiltrating materials and coatings include, for example, molten waxes, polyurethane-based coatings, acrylic-based coatings, and epoxy-based coatings.

A three-dimensional article formed using the materials, systems, and processes described in this specification comprise a plurality of distributed layers of the mixture of the solid particles and the solidified binder. The layers can each independently have a thickness in the range of thickness ranging from 10 µm to 1000 µm, or any sub-range subsumed therein, such as, for example, 25-500 µm, 50-250 µm, 80-180 µm, or 100-150 µm. The two-dimensional faces of the constituent cross-sectional layers stack and bond together, and the final shape of the three-dimensional article is defined by the collective contours of each of the constituent cross-sectional layers. The viewable surface of the three-dimensional printed article thus comprises layer edges only, except for the faces of the uppermost and lowermost layers.

The process illustrated in FIGS. 1A-1D produces a three-dimensionally printed article in a stationary planar bed, wherein the printing nozzle or nozzles move vertically to accommodate the addition of each layer of solid particles. However, a three-dimensionally printed article can be produced in a moveable planar bed configured for vertical movement relative to a printing nozzle. FIGS. 3A-3D show a process for producing an article by three-dimensional printing with a moveable planar bed 112. Referring to FIG. 1A, a layer of solid particles 110 is positioned in the planar bed 112 over a vertically-moveable platform 115 in a container 114. The vertical movement of the platform 115 can be actuated through a support member 117. As described above in connection with FIGS. 1A-1D, the layer of solid particles 110 comprises powder or other collection of particulate materials, which can be present in a loose and free-flowable form (i.e., un-compacted) or in a compacted density. The layer of solid particles 110 can be positioned in the planar bed 112 on the platform 115 in the container 114 using any suitable application techniques and equipment (not shown), such as, for example, pneumatically-operated or gravity-driven powder dispensers, spreading blades, and/or counter-rotating rollers.

Figure 3A:
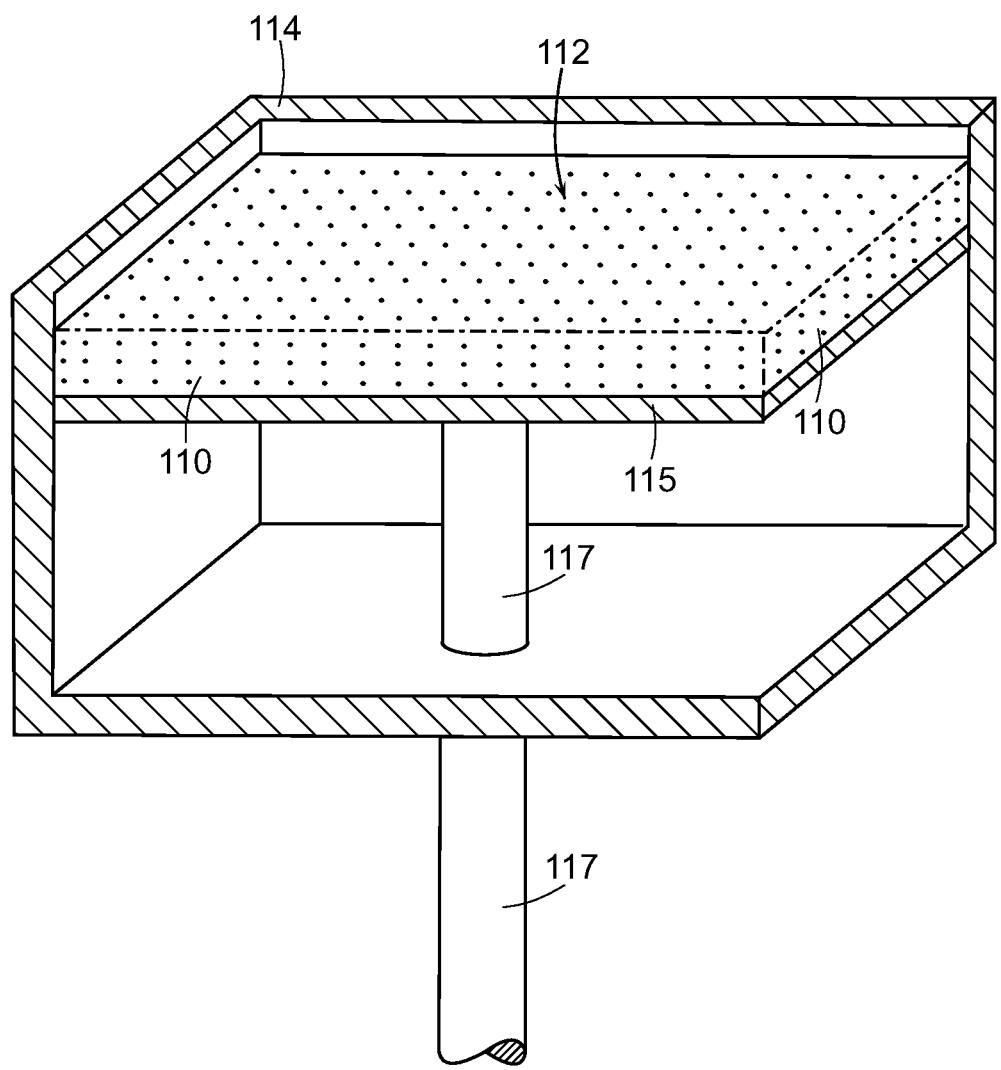
FIG. 3A is a cross-sectional schematic diagram in perspective view showing a layer of solid particles in a moveable planar bed configured for vertical movement relative to a printing nozzle (not shown)
Figure 3B:
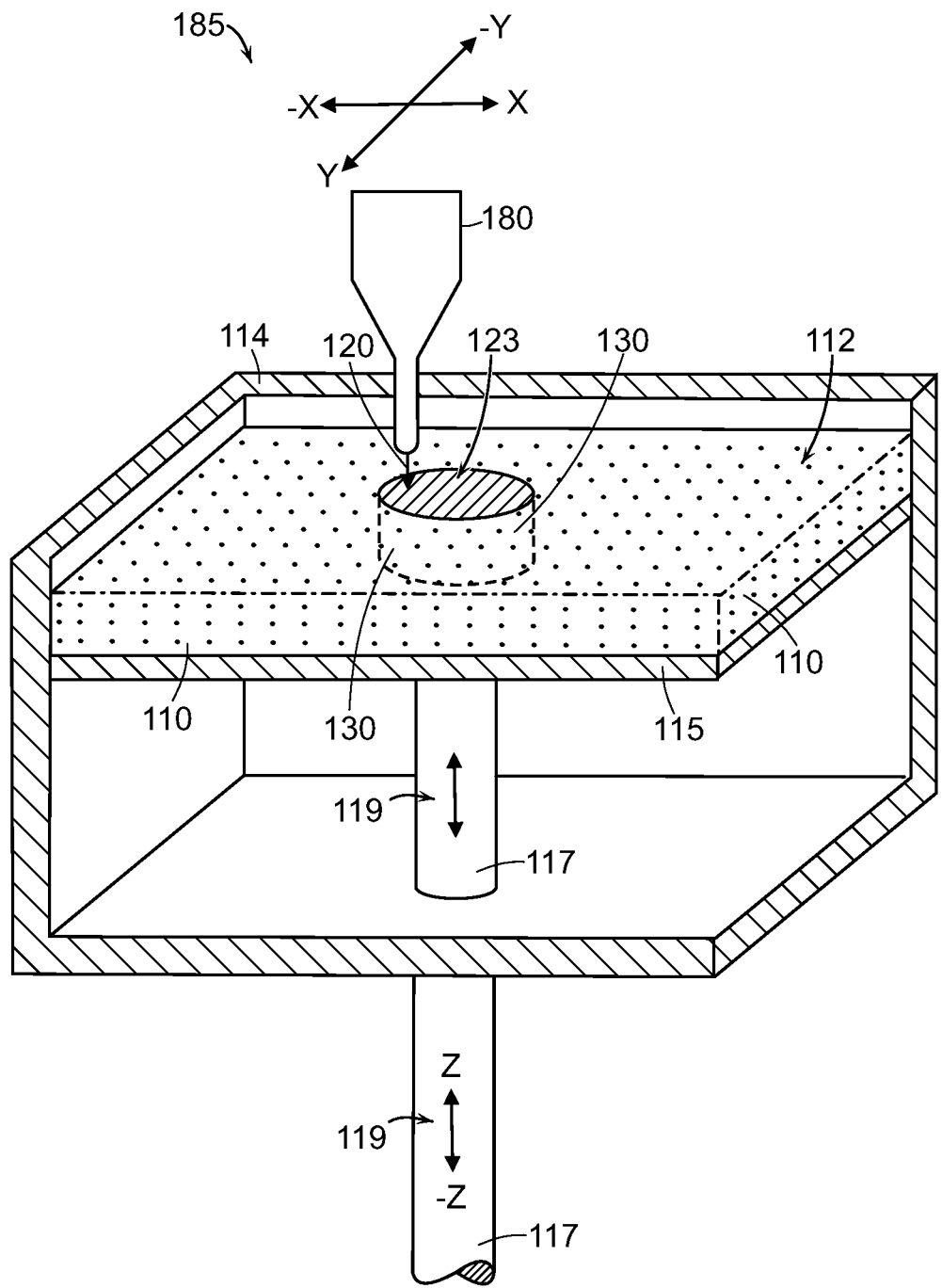
FIG. 3B is a cross-sectional schematic diagram in perspective view showing the application of a liquid binder over a predetermined area of the layer of solid particles shown in FIG. 3A, and the infiltration of the gaps between the solid particles with the liquid binder in the predetermined area to form a first cross-sectional layer of an article.

Referring to FIG. 3B, a liquid binder 120 is applied over a predetermined area 123 of the layer of solid particles 110 in the planar bed 112 on the platform 115 in the container 114. The liquid binder 120 comprises a 1,1-di-activated vinyl compound, or a multifunctional form thereof, or a combination thereof, as described below. The liquid binder 120 infiltrates the gaps between the solid particles in the predetermined area 123 of the layer of solid particles 110, wets out the solid particles, and forms a first cross-sectional layer 130 of an article. The 1,1-di-activated vinyl compound, or multifunctional form thereof, or combination thereof, in the liquid binder 120 reacts, as described below, and solidifies the liquid binder 120, which binds together the solid particles in the first cross-sectional layer 130.

The liquid binder 120 is applied over the predetermined area 123 of the layer of solid particles 110 using a suitable nozzle 180. The nozzle 180 can be computer-controlled and have four translational degrees-of-freedom, as indicated at 185—i.e., the nozzle 180 can move in the X and Y directions parallel to the planar bed 112 to apply the liquid binder 120 in the predetermined area 123 (although not shown, and not strictly necessary in the implementation illustrated in FIGS. 3A-3D), and the nozzle 180 can optionally move in the vertical direction perpendicular to the planar bed 112 to position the nozzle 180 closer to or farther away from the planar surface of the layer of solid particles 110). Although not shown in FIGS. 3B-3C, it is understood that implementations of the processes described in this specification can utilize two or more nozzles to apply the liquid binder 120 in the predetermined area 123 (for example, an inkjet-like print head comprising multiple nozzles).

Figure 3C:
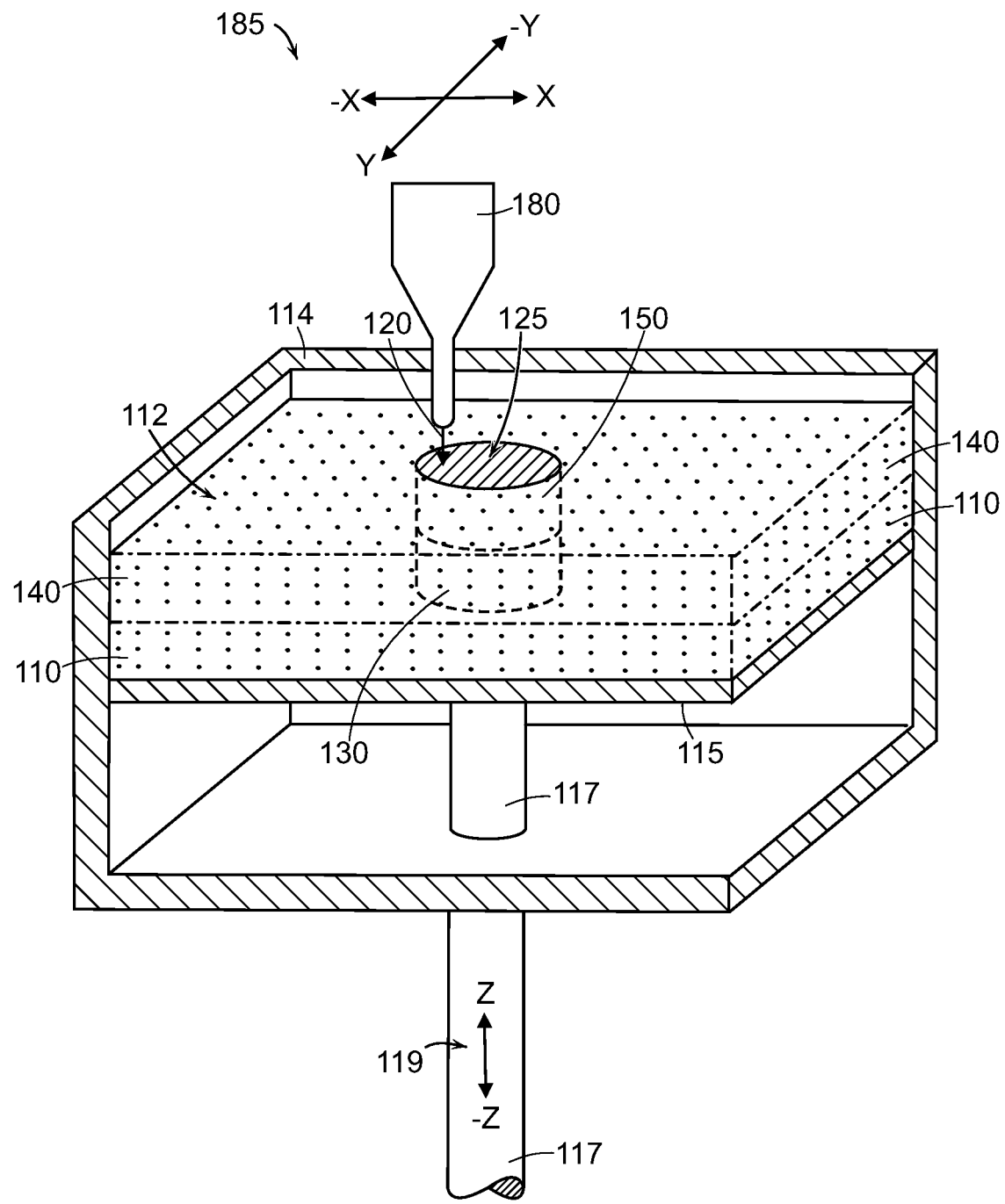
FIG. 3C is a cross-sectional schematic diagram in perspective view showing (i) elevational movement of the planar bed, (ii) the positioning of a second layer of solid particles over the first cross-sectional layer of the article shown in FIG. 3B, (iii) the application of additional liquid binder over a predetermined area of the second layer of solid particles, and (iv) the infiltration of the gaps between the solid particles with the additional liquid binder in the predetermined area of the second layer of solid particles to form a second cross-sectional layer of an article, wherein the second cross-sectional layer of the article is located over and in physical contact with the first cross-sectional layer of the article.
Figure 3D:
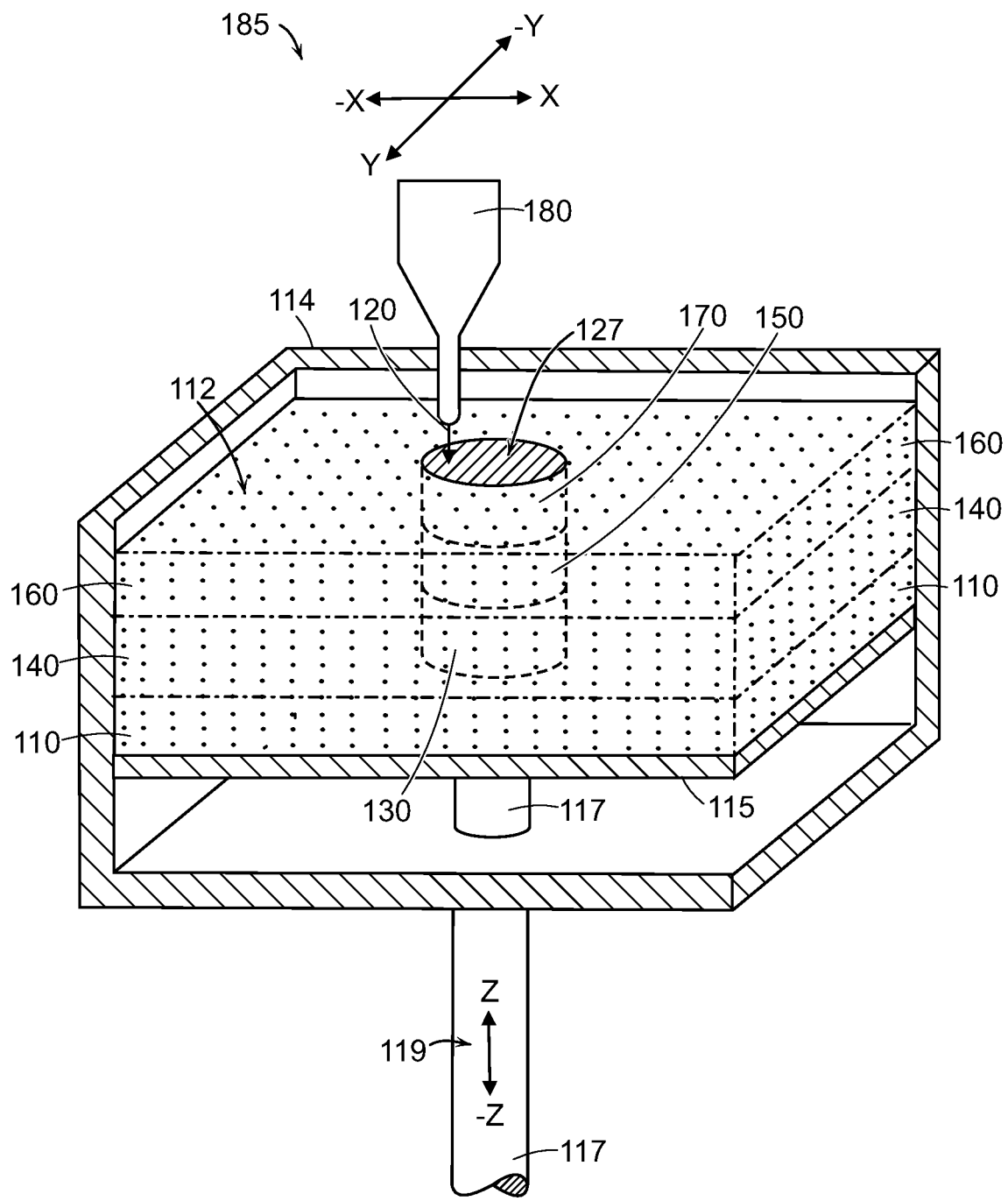
FIG. 3D is a cross-sectional schematic diagram in perspective view showing (i) elevational movement of the planar bed, (ii) the positioning of a third layer of solid particles over the second cross-sectional layer of the article shown in FIG. 3C, (iii) the application of additional liquid binder over a predetermined area of the third layer of solid particles, and (iv) the infiltration of the gaps between the solid particles with the additional liquid binder in the predetermined area of the third layer of solid particles to form a third cross-sectional layer of an article, wherein the third cross-sectional layer of the article is located over and in physical contact with the second cross-sectional layer of the article.

A process for producing an article by three-dimensional printing can further comprise repeating the powder/particle-positioning, liquid binder application, infiltration, and reaction steps, as described above, a plurality of times to produce a plurality of bonded cross-sectional layers that together comprise the three-dimensional article. Referring to FIG. 3C, the platform 115 is moved downwardly (along the Z-axis, as indicated at 119), which moves the surface of the first layer of solid particles 110 and the first cross-sectional layer 130 of the three-dimensional article being printed away from the nozzle 180. A second layer of solid particles 140 is positioned over the first layer of solid particles 110 and over the first cross-sectional layer 130 of the article. Additional liquid binder 120 is applied over a predetermined area 125 of the second layer of solid particles 140 in the planar bed 112 on the platform 115 in the container 114. The liquid binder 120 comprises a 1,1-di-activated vinyl compound, or a multifunctional form thereof, or a combination thereof, as described below. The liquid binder 120 infiltrates the gaps between the solid particles in the predetermined area 125 of the second layer of solid particles 140, wets out the solid particles, and forms a second cross-sectional layer 150 of the article. The second cross-sectional layer 150 is located over and in physical contact with the first cross-sectional layer 130 of the article. The 1,1-di-activated vinyl compound, or multifunctional form thereof, or combination thereof, in the liquid binder 120 reacts, as described below, and solidifies the liquid binder 120, which binds together the solid particles in the second cross-sectional layer 150, and also binds together the first cross-sectional layer 130 and the second cross-sectional layer 150.

Referring to FIG. 3D, platform 115 is again moved downwardly (along the Z-axis, as indicated at 119), which moves the surface of the second layer of solid particles 140 and the second cross-sectional layer 150 of the three-dimensional article being printed away from the nozzle 180. A third layer of solid particles 160 is positioned over the second layer of solid particles 140 and over the second cross-sectional layer 150 of the article. Additional liquid binder 120 is applied over a predetermined area 127 of the third layer of solid particles 160 in the planar bed 112 on the platform 115 in the container 114. The liquid binder 120 comprises a 1,1-di-activated vinyl compound, or a multifunctional form thereof, or a combination thereof, as described below. The liquid binder 120 infiltrates the gaps between the solid particles in the predetermined area 127 of the third layer of solid particles 160, wets out the solid particles, and forms a third cross-sectional layer 170 of the article. The third cross-sectional layer 170 is located over and in physical contact with the second cross-sectional layer 150 of the article. The 1,1-di-activated vinyl compound, or multifunctional form thereof, or combination thereof, in the liquid binder 120 reacts, as described below, and solidifies the liquid binder 120, which binds together the solid particles in the third cross-sectional layer 170, and also binds together the second cross-sectional layer 150 and the third cross-sectional layer 170. The process illustrated in FIGS. 3A-3D produces a three-dimensionally printed article that is analogous to the article 90 described in connection with FIGS. 2A and 2B.

As described above, the liquid binder comprises a 1,1-di-activated vinyl compound, or multifunctional form thereof, or combination thereof. The 1,1-di-activated vinyl compound can comprise methylene dicarbonyl compounds, dihalo vinyl compounds, dihaloalkyl disubstituted vinyl compounds, or cyanoacrylate compounds, or multifunctional forms of any thereof, or combinations of any thereof. Examples of 1,1-di-activated vinyl compounds and multifunctional forms thereof that can be used to formulate the liquid binder are described in U.S. Pat. Nos. 8,609,885; 8,884,051; 9,108,914; 9,181,365; and 9,221,739, which are incorporated by reference into this specification. Additional examples of 1,1-di-activated vinyl compounds and multifunctional forms thereof that can be used to formulate the liquid binder are described in U.S. Publication Nos. 2014/0288230; 2014/0329980; and 2016/0068618, which are incorporated by reference into this specification.

The liquid binder can be formulated with a 1,1-di-activated vinyl compound comprising a methylene malonate. Methylene malonates are compounds having the general formula (I):

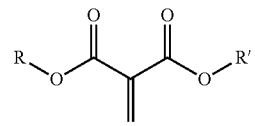

wherein R and R' can be the same or different and can represent nearly any substituent or side-chain, such as substituted or unsubstituted alkyl or aryl groups. For example, the liquid binder can be formulated with a dialkyl methylene malonate, a diaryl methylene malonate, a multifunctional form of a dialkyl methylene malonate, or a multifunctional form of a diaryl methylene malonate, or a combination of any thereof.

A multifunctional form of a methylene malonate can comprise a transesterification adduct of the methylene malonate and a polyol. A multifunctional form of a methylene malonate can thus have the general formula (II):

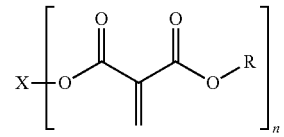

wherein X is a polyol residue and each R may be the same or different, as described above. As used herein the term "residue" refers to a group derived from the respective compound. For instance, in the above formula, X is an n-valent group derived from a polyol by a transesterification reaction involving methylene malonate and n hydroxyl groups of said polyol. Likewise, a polymer comprising residues of a certain compound is obtained from polymerizing said compound. In some examples, a multifunctional form of a methylene malonate can comprise a transesterification adduct of the methylene malonate and a diol, and thus have the general formula (III):

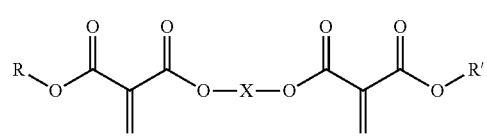

wherein X is a diol residue and R and R' can be the same or different, as described above.

Polyols that are suitable for the production of a transesterification adduct with a methylene malonate include, for example, polymeric polyols (such as polyether polyols, polyester polyols, acrylic polyols, and polycarbonate polyols) and monomeric polyols (such as alkane polyols, including alkane diols such as 1,5-pentanediol and 1,6-hexanediol). The transesterification adduct can be formed by the reaction of a methylene malonate and a polyol, in the presence of a catalyst, in a suitable reaction medium. Examples of transesterification adducts of methylene malonates and polyols that may be used in the coating compositions are described in U.S. Publication No. 2014/0329980 and U.S. Pat. No. 9,416,091, which are incorporated by reference herein. Further, the concentration of the transesterification adduct can be influenced by ratio of the reactants and/or distillation or evaporation of the reaction medium.

The liquid binder can be formulated with dimethyl methylene malonate (D3M), a multifunctional form of D3M, or both. The liquid binder can be formulated with diethyl methylene malonate (DEMM), a multifunctional form of DEMM, or both. The multifunctional forms of D3M or DEMM can comprise transesterification adducts of D3M or DEMM and a polyol, such as, for example, 1,5-pentanediol or 1,6-hexanediol.

The liquid binder can be formulated with a combination of a dialkyl methylene malonate and a multifunctional form of a dialkyl methylene malonate. The liquid binder can be formulated with, for example, DEMM and a multifunctional form of DEMM comprising a transesterification adduct of DEMM and at least one polyol. The DEMM can be transesterified with polyol comprising, for example, an alkane diol such as 1,5-pentanediol or 1,6-hexanediol.

1,1-Di-activated vinyl compounds, including multifunctional forms thereof, anionically polymerize through the vinyl functionality in the molecules and produce polymers having carbon-carbon backbone chains. Binders comprising multifunctional forms of 1,1-di-activated vinyl compounds will anionically polymerize through the multiple vinyl functionality in the molecules and form cross-linked thermoset polymers networks having carbon-carbon backbone chains covalently linked together through crosslinking groups provided from the linking groups in the multifunctional 1,1-di-activated vinyl compound molecules. Without intending to be limited by any theory, it is believed that 1,1-di-activated vinyl compounds, including multifunctional forms thereof, spontaneously polymerize under alkaline conditions. Thus, when the gaps between solid particles are infiltrated with a liquid binder comprising a 1,1-di-activated vinyl compound, or a multifunctional form thereof, or a combination thereof, the 1,1-di-activated vinyl compounds react by polymerizing, which solidifies and hardens the liquid binder, binds the solid particles together, and binds constituent cross-sectional layers to adjacent cross-sectional layers in a three-dimensional printed article.

The surface chemistry of the solid particles can be sufficiently alkaline that polymerization of 1,1-di-activated vinyl compounds occurs spontaneously upon contact of the liquid binder and the solid particles. For example, glass materials such as soda-lime glass (A-glass) and borosilicate glass (E-glass) are relatively alkaline materials and, as such, glass particles (e.g., solid glass microspheres) will spontaneously initiate the polymerization of 1,1-di-activated vinyl compounds upon contact. However, the surface chemistry of the solid particles may be insufficiently alkaline to spontaneously initiate polymerization, and an activator compound can be applied (e.g., sprayed or otherwise deposited) over at least a portion of the cross-sectional layers formed after the applied liquid binder infiltrates between the solid particles to activate the polymerization reaction. Alternatively, or in addition, the solid particles can be surface treated with an activator compound before using the solid particles in a three-dimensional printing process.

As used in this specification, the term "activator" means a compound or other agent capable of initiating and/or catalyzing polymerization of 1,1-di-activated vinyl compounds or multifunctional forms thereof. The term "activator" includes (1) active forms of activator compounds and (2) latent precursor forms of activator compounds that are capable of conversion from the latent precursor form into the active form (e.g., by exposure to an effective amount of heat, electromagnetic radiation, pressure, or a chemical co-activator). Additionally, latent precursor forms of activator compounds that are capable of conversion into the active form include activators associated with a volatile or otherwise removable neutralizing agent or inhibitor compound that can evaporate or otherwise be removed from an activator compound when applied over a cross-sectional layer, thereby activating the activator.

The activator can comprise a base. As used in this specification, the term "base" means an electronegative compound or functional group capable of initiating the anionic polymerization of a 1,1-di-activated vinyl compound. Suitable activators include organic bases (e.g., amine-containing compounds and carboxylate salts), inorganic bases (e.g., hydroxide salts, carbonate salts, and metal oxides), organometallic compounds, and combinations of any thereof. Suitable activators also include polymers comprising pendant and/or terminal amine, carboxylate salt, or other base functionality capable of initiating the anionic polymerization of a 1,1-di-activated vinyl compound.

The activator can comprise a strong base (pH over 9), a moderate base (pH from 8-9), or a weak base (pH from over 7 to 8), or a combination of any thereof. The activator can comprise, for example, sodium acetate; potassium acetate; acid salts of sodium, potassium, lithium, copper, or cobalt; tetrabutyl ammonium fluoride, chloride, or hydroxide; an amine, including primary, secondary, and tertiary amines; an amide; salts of polymer bound acids; benzoate salts; 2,4-pentanedionate salts; sorbate salts; propionate salts; secondary aliphatic amines; piperidene, piperazine, N-methylpiperazine, dibutylamine, morpholine, diethylamine, pyridine, triethylamine, tripropylamine, triethylenediamine, N,N-dimethylpiperazine, butylamine, pentyl amine, hexylamine, heptylamine, nonylamine, decylamine; 1,4-diazabicyclo[2.2.2]octane (DABCO); 1,1'-iminobis-2-propanol (DIPA); 1,2-cyclohexanediamine; 1,3-cyclohexandimethanamine; 2-methylpentamethylenediamine; 3,3-iminodipropylamine; triacetone diamine (TAD); salts of amines with organic monocarboxylic acids; piperidine acetate; metal salt of a lower monocarboxylic acid; copper(II) acetate, cupric acetate monohydrate, zinc acetate, zinc chloracetate, magnesium chloracetate, magnesium acetate; salts of acid containing polymers; salts of polyacrylic acid co-polymers; and combinations of any thereof.

An activator compound can comprise a tertiary amine compound such as, for example, DABCO; 2-(dimethylamino)ethanol (DMAE/DMEA); 2-piperazin-1-ylethylamine; N,N,N',N'-tetrakis(2-hydroxypropyl)ethylenediamine; 2-[2-(dimethylamino)ethoxy]ethanol; 1-[bis[3-(dimethylamino)propyl]amino]-2-propanol; N,N,N',N'',N''-pentamethyldiethylenetriamine; N,N,N',N'-tetraethyl-1,3-propanediamine; N,N,N',N'-tetramethyl-1,4-butanediamine; N,N,N',N'-tetramethyl-1,6-hexanediamine; 1,4,8,11-tetramethyl-1,4,8,11-tetraazacyclotetradecane; 1,3,5-trimethylhexahydro-1,3,5-triazine; methyl dicocoamine; 1,8-diazabicycloundec-7-ene (DBU); 1,5-diazabicyclo-[4,3,0]-non-5-ene (DBN); 1,1,3,3-tetramethylguanidine; 1,5,7-triazabicyclo[4.4.0]dec-5-ene; 7-methyl-1,5,7-triazabicyclo[4.4.0]dec-5-ene; or combinations of any thereof. A tertiary amine activator can comprise a bicyclic guanidine compound or a substituted derivative thereof, such as, for example, 1,5,7-triazabicyclo[4.4.0]dec-5-ene; or 7-methyl-1,5,7-triazabicyclo[4.4.0]dec-5-ene, or a substituted derivative of either thereof, or a combination of any thereof.

An activator compound can comprise an aminosilane compound. Aminosilane compounds have an amine group and a silane group covalently bonded in the same molecule.

Examples of suitable aminosilane compounds include tri-alkoxysilanes such as 3-aminopropyltriethoxysilane. The solid particles can be surface treated by contacting the solid particles with an activator compound, such as an aminosilane compound or other amine compound, for example, and then using the pre-treated solid particles in a three-dimensional printing process. The activator compound can chemically and/or physically adsorb onto the surfaces of the solid particles, for example, to increase the alkalinity of the particles' surface chemistry.

Additional examples of activators and activation methods that can be used in connection with the present invention are described in U.S. Pat. No. 9,181,365, which is incorporated by reference into this specification.

As used in this specification, the terms "solid particles," "powder," "particulate material," and the like, are generally synonymous and mean a free-flowable accumulation of discrete pieces of solid-state material. Generally, the size of the solid particles is limited by the thickness of the constituent cross-sectional layers to be printed—i.e., the particles are preferably approximately smaller than the thickness of the layers to be printed. The solid particles can have any regular or irregular shape. Using smaller solid particles can provide advantages such as smaller feature size, the ability to use thinner layers, and the ability to reduce what is known in the art of three-dimensional printing as a "stair stepping" effect. The solid particles can have a mean particle size, determined using microscopic image analysis, ranging from 1 µm to 500 µm, or any sub-range subsumed therein, such as, for example, 5-250 µm, 10-300 µm, 10-100 µm, or 10-50 µm.

The solid particles can comprise organic particles (i.e., particles comprising organic material such as carbon-based plastics, bio-derived materials, or predominantly carbon material (e.g., carbon black, graphite, graphene, carbon nanotubes, and the like)) or inorganic particles (i.e., particles comprising inorganic materials such as metals, alloys, glasses, ceramics, minerals, and the like), or a combination of any thereof.

The solid particles can comprise thermoplastic or other polymer particles. Examples of polymers particles include particles comprising thermoplastic materials such as poly(methyl methacrylate), polystyrene, polyamides, polyesters, polyethylene, polypropylene, polyurethanes, polyvinyl chloride, polyvinyl acetate, polyvinyl pyrrolidone, poly(ethylene terephthalate), styrene-acrylonitrile copolymer, an epoxy-based polymer, polyethers, polyamines, polyacids, polycarbonates, and polysiloxanes.

The solid particles can comprise inorganic particles, which can comprise any inorganic material in particulate form, such as, for example, metal particles, alloy particles, metal oxide particles, or glass particles. The solid particles can comprise metal or alloy particles such as particles comprising iron or iron-base alloys (e.g., steels), titanium or titanium-base alloys, or aluminum or aluminum-base alloys. The solid particles can comprise metal oxide particles such as particles comprising titanium dioxide, zirconium dioxide, zinc oxide, silicon dioxide (silica), magnesium oxide, an iron oxide (e.g., iron(III) oxide ($Fe_2O_3$)-based pigments), a chromium oxide (e.g., chromium(III) oxide ($Cr_2O_3$)-based particles), or particles comprising an aluminum oxide (e.g., alumina ($Al_2O_3$)-based particles), or a combination of any thereof. The solid particles can comprise titanium dioxide, zirconium dioxide, zinc oxide, magnesium oxide, an iron oxide, a chromium oxide, silicon dioxide (silica), an aluminum oxide (alumina), or a glass, or a combination of any thereof.

The solid particles can comprise glass particles and/or silica particles. Examples of suitable glass particles include solid glass microspheres (e.g., Spheriglass® products, available from Potters Industries LLC, Valley Forge, Pa., USA). The solid particles can comprise mixtures of different particles, such as, for example, mixtures comprising glass particles and metal oxide particles.

The solid particles can also comprise a particle composition comprising core particles comprising a functionalizing layer over at least a portion of the outer surface of the core particles, wherein the functionalizing layer comprises a reaction product of a 1,1-di-activated vinyl compound, or a multifunctional form thereof, or a combination thereof. Such particle compositions are described, for example, in a co-pending provisional patent application filed on the same date as the present application entitled "PARTICLES HAVING SURFACES FUNCTIONALIZED WITH 1,1-DI-ACTIVATED VINYL COMPOUNDS," and corresponding to Attorney Docket No. 16011114V1, which is incorporated by reference into this specification.

The three-dimensional articles produced by the processes described in this specification comprise a plurality of cross-sectional layers bonded together, wherein each cross-sectional layer comprises a solid binder comprising a reaction product of a 1,1-di-activated vinyl compound, or a multifunctional form thereof, or a combination thereof, and a plurality of solid particles embedded in the solid binder. The three-dimensional articles can be further processed, for example, to produce a sintered or otherwise fused article. In one example, the process can produce a three-dimensional article comprising thermoplastic particles embedded in the solid binder, and the article can be heat treated to sinter or fuse the thermoplastic particles together. In another example, the process can produce a three-dimensional article comprising metal and/or alloy particles embedded in the solid binder, and the article can be heat treated to sinter the metal and/or alloy particles together, optionally with pyrolysis or other removal of the solid binder from the sintered article.

WORKING EXAMPLES

The following working examples are intended to further describe the invention. It is understood that the invention described in this specification is not necessarily limited to the examples described in this section.

Example 1

A layer of soda-lime glass microspheres pretreated with an amino-silane coupling agent (Spheriglass® 3000 CP-03, commercially available from Potters Industries LLC, Valley Forge, Pa., USA) was positioned to form a planar bed. A liquid binder was applied over the layer of glass microspheres using a syringe (5 milliliters of diethyl methylene malonate—DEMM). The applied DEMM binder infiltrated into the layer and wet out the glass microspheres. The DEMM binder polymerized upon contact with the glass microspheres, solidified within 20-30 seconds, and formed a first layer comprising the glass microspheres embedded within the solidified DEMM binder.

A second layer of the glass microspheres (2 grams) was positioned over the first layer comprising the glass microspheres embedded within the solidified DEMM binder. Additional liquid DEMM binder (5 milliliters) was applied over the layer of glass microspheres using a syringe. The applied DEMM binder infiltrated into and wet out the second layer of glass microspheres. The DEMM binder polymerized upon contact with the glass microspheres, solidified within 20-30 seconds, and formed a second layer comprising the glass microspheres embedded within the solidified DEMM binder. The polymerization of the DEMM also bonded together the first and second layers comprising the glass microspheres embedded within the solidified DEMM binder.

The above-described lay-up procedure was repeated two additional times to produce a prototype three-dimensional article comprising four cross-sectional layers bonded together, each cross-sectional layer comprising a solid binder comprising a polymerization reaction product of DEMM and glass microspheres embedded within the solid binder. The four constituent layers built-up a monolithic and integral three-dimensional article.

Example 2

A layer of boro-silicate glass microspheres was positioned to form a planar bed (2 grams of Spheriglass® 3000E, available from Potters Industries LLC, Valley Forge, Pa., USA). A liquid binder was applied over the layer of glass microspheres using a syringe (5 milliliters DEMM). The applied DEMM binder infiltrated into the layer and wet out the glass microspheres. The DEMM binder polymerized upon contact with the glass microspheres, solidified within 20-30 seconds, and formed a layer comprising the glass microspheres embedded within the solidified DEMM binder.

Example 3

An amorphous precipitated silica powder pre-treated with an aminosilane coupling agent was prepared as follows. 300 parts-by-weight of silica powder (Lo-Vel 27, available from PPG Industries, Inc., Pittsburgh, Pa., USA) were mixed with 30 parts-by-weight of 3-aminopropyltriethoxysilane (Silquest A1100, available from Momentive Performance Materials Inc.) and 70 parts-by-weight of n-butyl acetate in a V-blender equipped with an intensifier bar. The components were added over 3 minutes and then allowed to mix for an additional 3-5 minutes. The mixture was then heated overnight in an oven operating at 85° C.

A layer of the aminosilane-treated silica particles (2 grams) was positioned to form a planar bed. A liquid binder was applied over the layer of silica using a syringe (5 milliliters DEMM). The applied DEMM binder infiltrated into the layer and wet out the silica particles. The DEMM binder polymerized over approximately 1.5 hours and formed a layer comprising the silica particles embedded within the solidified DEMM binder.

As second layer of the aminosilane-treated silica particles (2 grams) was positioned over the first layer comprising silica particles embedded within the solidified DEMM binder. Additional liquid DEMM binder (5 milliliters) was applied over the layer of silica particles using a syringe. The applied DEMM binder infiltrated into and wet out the second layer of glass microspheres. The applied DEMM binder infiltrated into the layer and wet out the silica particles. The DEMM binder polymerized over approximately 1.5 hours and formed a layer comprising the silica particles embedded within the solidified DEMM binder. The polymerization of the DEMM also bonded together the first and second layers comprising the silica particles embedded within the solidified DEMM binder.

This procedure produced a prototype three-dimensional article comprising two cross-sectional layers bonded together, each cross-sectional layer comprising a solid binder comprising a polymerization reaction product of DEMM and silica particles embedded within the solid binder. The two constituent layers built-up a monolithic and integral three-dimensional article.

Example 4

A layer of amorphous precipitated silica powder (2 grams of Lo-Vel 27, available from PPG Industries, Inc., Pittsburgh, Pa., USA) was positioned to form a planar bed. A liquid binder was applied over the layer of silica using a syringe (5 milliliters DEMM). The applied DEMM binder infiltrated into the layer and wet out the silica particles. The DEMM binder did not polymerize. Without intending to be bound by any theory, it is believed that the relatively acidic surface chemistry of the silica particles (pH of approximately 6.5-7.3 in water) was unable to initiate anionic polymerization through the vinyl functionality in the DEMM molecules. In contrast, in Example 3, the amine functionality in the 3-aminopropyl-triethoxysilane was believed to be sufficiently alkaline to initiate anionic polymerization of the DEMM binder.

Aspects of the Invention

Aspects of the invention include, but are not limited to, the following numbered clauses.

1. A process for producing an article by three-dimensional printing, the process comprising:
    positioning a layer of solid particles in a planar bed;
    applying a liquid binder over a predetermined area of the layer of solid particles, the liquid binder comprising a 1,1-di-activated vinyl compound, or a multifunctional form thereof, or a combination thereof;
    infiltrating gaps between the solid particles with the liquid binder in the predetermined area of the layer of solid particles to form a first cross-sectional layer of an article; and reacting the 1,1-di-activated vinyl compound, or multifunctional form thereof, or combination thereof, thereby solidifying the liquid binder and binding the solid particles in the first cross-sectional layer of the article.
2. The process of clause 1, further comprising:
    (i) positioning a second layer of solid particles in the planar bed over the first cross-sectional layer of the article;
    (ii) applying additional liquid binder over a predetermined area of the second layer of solid particles, the liquid binder comprising the 1,1-di-activated vinyl compound, or multifunctional form thereof, or combination thereof;
    (iii) infiltrating the solid particles with the additional liquid binder in the predetermined area of the second layer of solid particles to form a second cross-sectional layer of the article, wherein the second cross-sectional layer of the article is located over and in physical contact with the first cross-sectional layer of the article; and
    (iv) reacting the 1,1-di-activated vinyl compound, or multifunctional form thereof, or combination thereof, thereby solidifying the liquid binder and binding the solid particles in the second cross-sectional layer of the article, and binding together the first and second cross-sectional layers of the article.

3. The process of clause 2, wherein steps (i)-(iv) are repeated a plurality of times to produce a plurality of bonded cross-sectional layers that together comprise the article.
4. The process of any one of clauses 1-3, wherein reacting the 1,1-di-activated vinyl compound, or multifunctional form thereof, or combination thereof, comprises polymerizing the 1,1-di-activated vinyl compound, or multifunctional form thereof, or combination thereof.
5. The process of clause 4, wherein the polymerization occurs spontaneously upon contact of the liquid binder and the solid particles.
6. The process of any one of clauses 1-5, wherein reacting the 1,1-di-activated vinyl compound, or multifunctional form thereof, or combination thereof, comprises applying an activator compound over at least a portion of the first cross-sectional layer of the article.
7. The process of clause 6, wherein the activator compound comprises a tertiary amine compound.
8. The process of clause 6 or clause 7, wherein the activator compound comprises 1,4-diazabicyclo[2.2.2] octane.
9. The process of clauses 6-8, wherein the activator compound activates polymerization of the 1,1-di-activated vinyl compound, or multifunctional form thereof, or combination thereof.
10. The process of any one of clauses 1-9, wherein the solid particles comprise an activator compound chemically and/or physically adsorbed onto surfaces of the solid particles.
11. The process of clause 6-10, wherein the activator compound comprises an amine compound.
12. The process of clause 10 or clause 11, wherein the activator compound comprises an aminosilane compound.
13. The process of any one of clauses 6-12, wherein the activator compound activates polymerization of the 1,1-di-activated vinyl compound, or multifunctional form thereof, or combination thereof.
14. The process of any one of clauses 1-13, wherein the solid particles comprise inorganic particles.
15. The process of any one of clauses 1-14, wherein the solid particles comprise titanium dioxide, zirconium dioxide, zinc oxide, magnesium oxide, an iron oxide, a chromium oxide, silicon dioxide, an aluminum oxide, a metal, an alloy, or a glass, or a combination of any thereof.
16. The process of any one of clauses 1-15, wherein the solid particles comprise glass particles.
17. The process of any one of clauses 1-16, wherein the solid particles comprise silica.
18. The process of any one of clauses 1-17, wherein the solid particles comprise organic particles.
19. The process of any one of clauses 1-18, wherein the solid particles comprise thermoplastic particles.
20. The process of any one of clauses 1-19, wherein the 1,1-di-activated vinyl compound comprises a methylene dicarbonyl compound, a dihalo vinyl compound, a dihaloalkyl disubstituted vinyl compound, or a cyanoacrylate compound, or a multifunctional form of any thereof, or a combination of any thereof.
21. The process of any one of clauses 1-20, wherein the 1,1-di-activated vinyl compound comprises:
a dialkyl methylene malonate;
a diaryl methylene malonate;
a multifunctional form of a dialkyl methylene malonate; or
a multifunctional form of a diaryl methylene malonate; or
a combination of any thereof.
22. The process any one of clauses 1-21, wherein the 1,1-di-activated vinyl compound comprises:
diethyl methylene malonate;
a multifunctional form of diethyl methylene malonate comprising a transesterification adduct of diethyl methylene malonate and at least one polyol;
dimethyl methylene malonate; or
a multifunctional form of dimethyl methylene malonate comprising a transesterification adduct of dimethyl methylene malonate and at least one polyol; or
a combination of any thereof.
23. The process any one of clauses 1-22, wherein the 1,1-di-activated vinyl compound comprises a transesterification adduct of diethyl methylene malonate and a diol.
24. The process clause 23, wherein the diol comprises an alkane diol.
25. The process clause 24, wherein the alkane diol comprises 1,5-pentane diol and/or 1,6-hexanediol.
26. A three-dimensional article comprising:
a plurality of cross-sectional layers bonded together, each cross-sectional layer comprising:
a solid binder comprising a reaction product of a 1,1-di-activated vinyl compound, or a multifunctional form thereof, or a combination thereof; and
a plurality of solid particles in the solid binder.
27. The three-dimensional article of clause 26, wherein the solid binder comprises a polymerization reaction product of the 1,1-di-activated vinyl compound, or multifunctional form thereof, or combination thereof.
28. The three-dimensional article of clause 26 or clause 27, wherein the solid particles comprise inorganic particles.
29. The three-dimensional article of any one of clauses 26-28, wherein the solid particles comprise titanium dioxide, zirconium dioxide, zinc oxide, magnesium oxide, an iron oxide, a chromium oxide, silicon dioxide, an aluminum oxide, a metal, an alloy, or a glass, or a combination of any thereof.
30. The three-dimensional article of any one of clauses 26-29, wherein the solid particles comprise glass particles.
31. The three-dimensional article of any one of clauses 26-30, wherein the solid particles comprise silica.
32. The three-dimensional article of any one of clauses 26-31, wherein the solid particles comprise organic particles.
33. The three-dimensional article of any one of clauses 26-32, wherein the solid particles comprise thermoplastic particles.
34. The three-dimensional article of any one of clauses 26-33, wherein the solid particles comprise an activator compound chemically and/or physically adsorbed onto surfaces of the solid particles.
35. The three-dimensional article of clause 34, wherein the activator compound comprises an amine compound.
36. The three-dimensional article of clause 34 or clause 35, wherein the activator compound comprises an aminosilane compound.
37. The three-dimensional article of any one of clauses 26-36, wherein the 1,1-di-activated vinyl compound comprises a methylene dicarbonyl compound, a dihalo vinyl compound, a dihaloalkyl disubstituted vinyl compound, or a cyanoacrylate compound, or a multifunctional form of any thereof, or a combination of any thereof. 38. The three-dimensional article of any one of clauses 26-37, wherein the 1,1-di-activated vinyl compound comprises:
a dialkyl methylene malonate;
a diaryl methylene malonate;

a multifunctional form of a dialkyl methylene malonate; or a multifunctional form of a diaryl methylene malonate; or a combination of any thereof.

39. The three-dimensional article of any one of clauses 26-38, wherein the 1,1-di-activated vinyl compound comprises:

diethyl methylene malonate;

a multifunctional form of diethyl methylene malonate comprising a transesterification adduct of diethyl methylene malonate and at least one polyol;

dimethyl methylene malonate; or a multifunctional form of dimethyl methylene malonate comprising a transesterification adduct of dimethyl methylene malonate and at least one polyol; or a combination of any thereof.

40. The three-dimensional article of any one of clauses 26-39, wherein the 1,1-di-activated vinyl compound comprises a transesterification adduct of diethyl methylene malonate and a diol.

41. The three-dimensional article of clause 40, wherein the diol comprises an alkane diol.

42. The three-dimensional article of clause 41, wherein the alkane diol comprises 1,5-pentane diol and/or 1,6-hexanediol.

43. The three-dimensional article of any of clauses 26-42 obtained by a process according to any of clauses 1-25.

44. Use of a 1,1-di-activated vinyl compound, or a multifunctional form thereof, or a combination thereof as described in any of clauses 20-25 or 37-43 as a binder in three-dimensional printing.

45. The use of clause 44 wherein the three-dimensional printing is carried out using the process of any of clauses 1-25 to produce the three-dimensional article of any of clauses 26-43.

Various features and characteristics are described in this specification to provide an understanding of the composition, structure, production, function, and/or operation of the invention, which includes the processes and articles. It is understood that the various features and characteristics of the invention described in this specification can be combined in any suitable manner, regardless of whether such features and characteristics are expressly described in combination in this specification. The Inventors and the Applicant expressly intend such combinations of features and characteristics to be included within the scope of the invention described in this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with written description, sufficiency of description, and added matter requirements, including the requirements under 35 U.S.C. § 112(a) and Article 123(2) EPC.

Any numerical range recited in this specification describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will comply with written description, sufficiency of description, and added matter requirements, including the requirements under 35 U.S.C. § 112(a) and Article 123(2) EPC. Also, unless expressly specified or otherwise required by context, all numerical parameters described in this specification (such as those expressing values, ranges, amounts, percentages, and the like) may be read as if prefaced by the word "about," even if the word "about" does not expressly appear before a number. Additionally, numerical parameters described in this specification should be construed in light of the number of reported significant digits, numerical precision, and by applying ordinary rounding techniques. It is also understood that numerical parameters described in this specification will necessarily possess the inherent variability characteristic of the underlying measurement techniques used to determine the numerical value of the parameter.

The invention(s) described in this specification can comprise, consist of, or consist essentially of the various features and characteristics described in this specification. The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. Thus, a composition, coating, or process that "comprises," "has," "includes," or "contains" one or more features and/or characteristics possesses those one or more features and/or characteristics, but is not limited to possessing only those one or more features and/or characteristics. Likewise, an element of a composition, coating, or process that "comprises," "has," "includes," or "contains" one or more features and/or characteristics possesses those one or more features and/or characteristics, but is not limited to possessing only those one or more features and/or characteristics, and can possess additional features and/or characteristics.

The grammatical articles "a," "an," and "the," as used in this specification, including the claims, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the described compositions, coatings, and processes. Nevertheless, it is understood that use of the terms "at least one" or "one or more" in some instances, but not others, will not result in any interpretation where failure to use the terms limits objects of the grammatical articles "a," "an," and "the" to just one. Further, the use of a singular noun includes the plural, and the use of a plural noun includes the singular, unless the context of the usage requires otherwise.

Any patent, publication, or other document identified in this specification is incorporated by reference into this specification in its entirety unless otherwise indicated, but only to the extent that the incorporated material does not conflict with existing descriptions, definitions, statements, illustrations, or other disclosure material expressly set forth in this specification. As such, and to the extent necessary, the express disclosure as set forth in this specification supersedes any conflicting material incorporated by reference. Any material, or portion thereof, that is incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference. The amendment of this specification to add such incorporated subject matter will comply with written description, sufficiency of description, and added matter requirements, including the requirements under 35 U.S.C. § 112(a) and Article 123(2) EPC.

What is claimed is:

1. A process for producing an article by three-dimensional printing, the process comprising:
    positioning a layer of solid particles in a planar bed, wherein the solid particles comprise an activator compound chemically and/or physically adsorbed onto surfaces of the solid particles;
    applying a liquid binder over a predetermined area of the layer of solid particles, the liquid binder comprising a 1,1-di-activated vinyl compound, or a multifunctional form thereof, or a combination thereof;
    infiltrating gaps between the solid particles with the liquid binder in the predetermined area of the layer of solid particles to form a first cross-sectional layer of an article; and
    reacting the 1,1-di-activated vinyl compound, or multifunctional form thereof, or combination thereof, thereby solidifying the liquid binder and binding the solid particles in the first cross-sectional layer of the article.

2. The process of claim 1, further comprising:
    (i) positioning a second layer of solid particles in the planar bed over the first cross-sectional layer of the article;
    (ii) applying additional liquid binder over a predetermined area of the second layer of solid particles, the liquid binder comprising the 1,1-di-activated vinyl compound, or multifunctional form thereof, or combination thereof;
    (iii) infiltrating gaps between the solid particles with the additional liquid binder in the predetermined area of the second layer of solid particles to form a second cross-sectional layer of the article, wherein the second cross-sectional layer of the article is located over and in physical contact with the first cross-sectional layer of the article; and
    (iv) reacting the 1,1-di-activated vinyl compound, or multifunctional form thereof, or combination thereof, thereby solidifying the liquid binder and binding the solid particles in the second cross-sectional layer of the article, and binding together the first and second cross-sectional layers of the article.

3. The process of claim 2, wherein steps (i)-(iv) are repeated a plurality of times to produce a plurality of bonded cross-sectional layers that together comprise the article.

4. The process of claim 1, wherein reacting the 1,1-di-activated vinyl compound, or multifunctional form thereof, or combination thereof, comprises polymerizing the 1,1-di-activated vinyl compound, or multifunctional form thereof, or combination thereof.

5. The process of claim 4, wherein the polymerization occurs spontaneously upon contact of the liquid binder and the solid particles.

6. The process of claim 1, wherein reacting the 1,1-di-activated vinyl compound, or multifunctional form thereof, or combination thereof, comprises applying an activator compound over at least a portion of the first cross-sectional layer of the article.

7. The process of claim 6, wherein the activator compound comprises a tertiary amine compound.

8. The process of claim 6, wherein the activator compound activates polymerization of the 1,1-di-activated vinyl compound, or multifunctional form thereof, or combination thereof.

9. The process of claim 1, wherein the activator compound comprises an amine compound.

10. The process of claim 9, wherein the activator compound comprises an aminosilane compound.

11. The process of claim 6, wherein the activator compound activates polymerization of the 1,1-di-activated vinyl compound, or multifunctional form thereof, or combination thereof.

12. The process of claim 11, wherein the solid particles comprise inorganic particles.

13. The process of claim 12, wherein the solid particles comprise titanium dioxide, zirconium dioxide, zinc oxide, magnesium oxide, an iron oxide, a chromium oxide, silicon dioxide, an aluminum oxide, a metal, an alloy, or a glass, or a combination of any thereof.

14. The process of claim 13, wherein the solid particles comprise glass particles.

15. The process of claim 14, wherein the solid particles comprise silica.

16. The process of claim 15, wherein the solid particles comprise organic particles.

17. The process of claim 16, wherein the solid particles comprise thermoplastic particles.

18. The process of claim 1, wherein the 1,1-di-activated vinyl compound comprises a methylene dicarbonyl compound, a dihalo vinyl compound, a dihaloalkyl disubstituted vinyl compound, or a cyanoacrylate compound, or a multifunctional form of any thereof, or a combination of any thereof.

19. The process claim 18 wherein the 1,1-di-activated vinyl compound comprises:
    diethyl methylene malonate;
    a multifunctional form of diethyl methylene malonate comprising a transesterification adduct of diethyl methylene malonate and at least one polyol;
    dimethyl methylene malonate; or
    a multifunctional form of dimethyl methylene malonate comprising a transesterification adduct of dimethyl methylene malonate and at least one polyol; or
    a combination of any thereof.

20. The process claim 19, wherein the 1,1-di-activated vinyl compound comprises a transesterification adduct of diethyl methylene malonate and a diol.

* * * * *